United States Patent [19]

Kiguchi

[11] 4,439,851

[45] Mar. 27, 1984

[54] TURNTABLE LIFTING APPARATUS OF A VIDEO DISC PLAYER

[75] Inventor: Majime Kiguchi, Fukaya, Japan

[73] Assignee: Tokyo Shibaura Denki Kabushiki Kaisha, Japan

[21] Appl. No.: 280,479

[22] Filed: Jul. 6, 1981

[30] Foreign Application Priority Data

Jul. 11, 1980 [JP] Japan .......................... 55-97840[U]

[51] Int. Cl.³ ............................................ G11B 17/04
[52] U.S. Cl. .................................. 369/77.2; 369/263; 369/264; 369/269
[58] Field of Search ............... 369/244, 263, 249, 255, 369/270, 271, 77, 75, 264

[56] References Cited

U.S. PATENT DOCUMENTS

| 4,040,107 | 8/1977 | Bryer | 369/77 |
| 4,057,840 | 11/1977 | Wingo | 369/291 |
| 4,326,284 | 4/1982 | Elliott | 369/268 |
| 4,337,533 | 6/1982 | Ando et al. | 369/77 |

FOREIGN PATENT DOCUMENTS

| 40880 | 12/1981 | European Pat. Off. | 369/75 |
| 709765 | 6/1966 | Italy | 369/77 |
| 54-126505 | 7/1979 | Japan . | |

Primary Examiner—Steven L. Stephan
Attorney, Agent, or Firm—Banner, Birch, McKie & Beckett

[57] ABSTRACT

According to the present invention, a turntable lifting apparatus of a video disc player comprises: (1) a turntable for supporting a video disc; (2) a chassis attached to said player in parallel with and under said turntable; (3) a bearing attached to said chassis for supporting a shaft of said turntable; (4) a turntable lifter slidably attached to said chassis and parallel to said chassis, which has an inclined slotted plate in its intermediate portion which engages the end portion of said turntable shaft for lifting said turntable.

5 Claims, 4 Drawing Figures

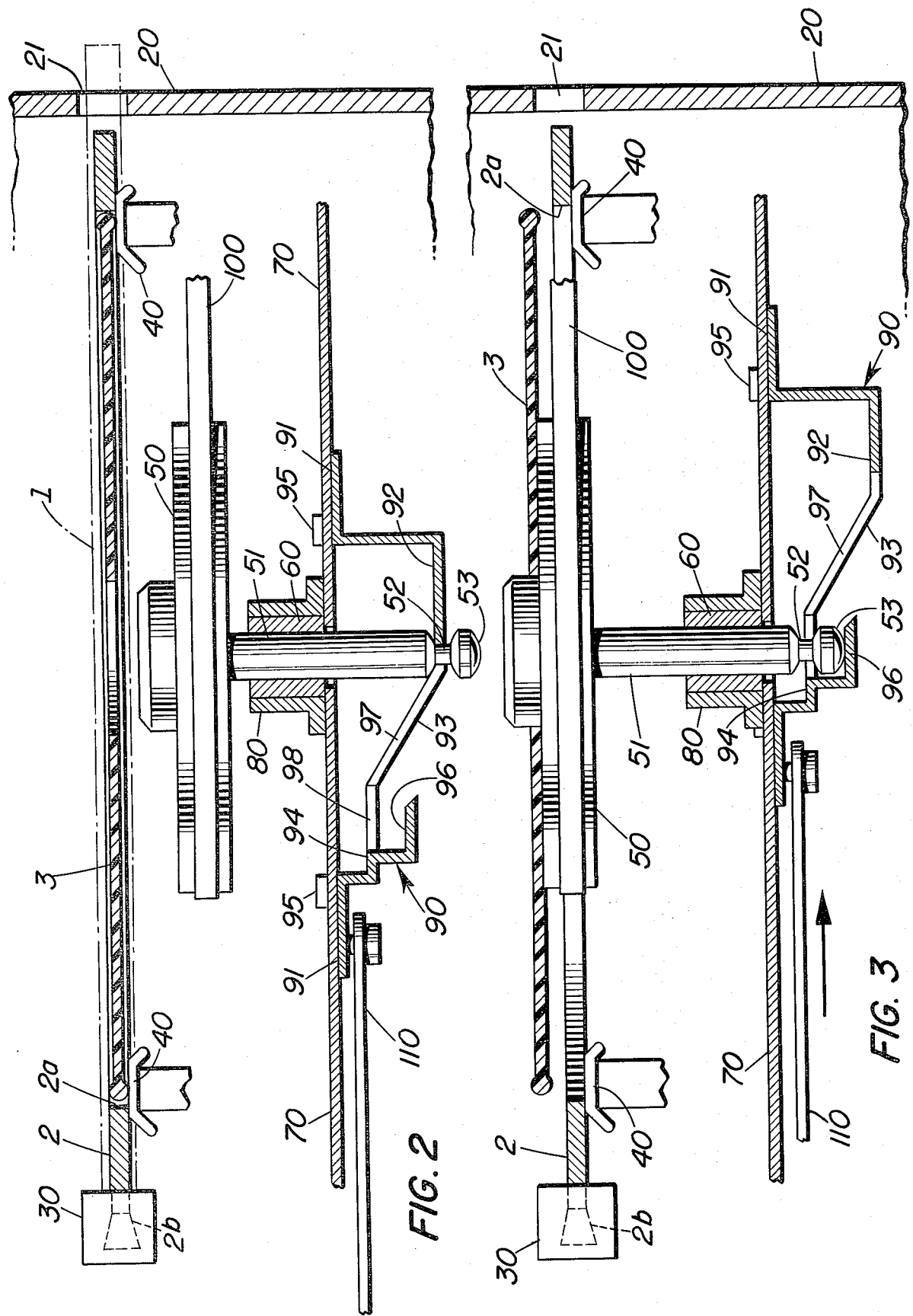

TURNTABLE LIFTING APPARATUS OF A VIDEO DISC PLAYER

BACKGROUND OF THE INVENTION

This invention relates to a video disc player and particularly to a turntable lifting and positioning apparatus for use with a video disk.

A video disc using the electrostatic recording method attracts and is extremely susceptible to the adverse effects of dust, lint, perspiration, oil, etc. Therefore, the video disc is held in a protective jacket and support element so that a user may set it on the turntable of a player without touching said disc.

The video disc inside it's protective jacket, is inserted into the player, after which the jacket is removed and the video disc is held inside the player.

A belt driven turntable located below the video disc is then raised to support and rotate the disc in the proper location inside the player.

SUMMARY OF THE INVENTION

Accordingly, an object of the present invention is to provide an improved turntable lifting apparatus of a video disc player.

According to the present invention, a turntable lifting apparatus of a video disc player comprises: (1) a turntable for supporting a video disc; (2) a chassis attached to said player in parallel with and under said turntable; (3) a bearing attached to said chassis for supporting a shaft of said turntable; (4) a turntable lifter slidably attached to said chassis and parallel to said chassis, which has an inclined cam plate in its intermediate portion which engages a cam follower at the end portion of said turntable shaft for lifting said turntable.

The object and advantages of the present invention will become apparent to persons skilled in the art from a study of the following description and the accompanying drawings.

BRIEF DESCRIPTION OF THE DRAWINGS

FIG. 2 is a cross-sectional view of a video disc player before the turntable is raised;

FIG. 3 is a cross-sectional view of a video disc player after the turntable is raised to lift the video disc into playing position.

DESCRIPTION OF THE PREFERRED EMBODIMENT

The present invention will be described in detail with reference to the accompanying drawings.

Figure 1:
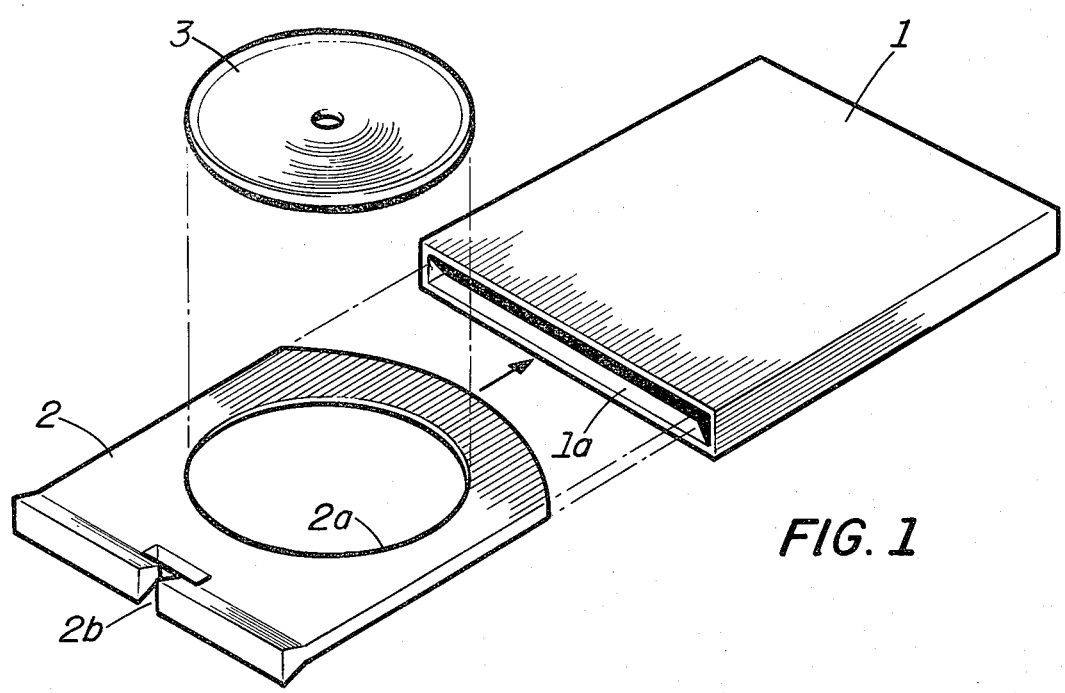
FIG. 1 is an exploded perspective view of a video disc and its protective jacket and support element.

Referring to FIG. 1, the manner in which a video disc is held in a protective jacket will be described. As shown, a protective jacket 1 has a box-like shape with an opening 1a at one end. A disc support element 2 can freely be inserted in jacket 1 through opening 1a and removed from it. A video disc 3 is inserted in a hole 2a of support element 2. The video disc is contained in support element 2 inside protective jacket 1.

Next, a sectional view of a video disc player before the turntable is lifted, is shown in FIG. 2. As illustrated, jacket 1, which already holds support element 2 and video disc 3, is inserted into a video disc player through an opening 21 at the front of its housing 20 preparatory to playing video disc 3. At this time, end 2b (FIG. 1) of support element 2 is caught by a gripper 30 which is positioned in housing 20 of the video disc player. Jacket 1 is then removed through opening 21. Video disc 3 and support element 2, however, are left in housing 20. Gripper 30 is constructed so that it may catch support element 2 when jacket 1 is inserted into housing 20 and then, release disc support element 2 when empty jacket 1 is again inserted in housing 20 after playback is completed.

Details of jacket 1, support element 2, video disc 3 and gripper 30 are disclosed in, Toshiba Japanese patent application No. SHO 52-74999 (unexamined publication No. SHO 54-9902).

Support element 2 and video disc 3, which are left in the player, are supported by plural supports 40 which are attached to the player. Supports 40 also regulate the position of video disc 3 in the player. Before the start of playback, a turntable 50 is positioned under the locus of jacket 1; in that position, it will not prevent jacket 1 from being inserted into the player. Turntable 50 has a shaft 51, which is supported by a bearing 60 which enables shaft 51 to rotate smoothly. Bearing 60 is fixed to a chassis 70 by a housing 80. Chassis 70 is attached to the player beneath turntable 50 and parallel to it. Shaft 51 of turntable 50 may slide up and down, in bearing 60. Such movement of shaft 51 is achieved by a slideable lifter element 90. Lifter 90 has at least four L-shaped support flanges 95 at the corners of top horizontal portions 91 which engage the under surface of chassis 70. The lifter 90 is supported on chassis 70 by flanges 95 which slide in suitable slots 95A in chassis 70. Lifter 90 is provided with an inclined plate 93 with a slot 97 which fits in a groove 52 formed near the bottom end 53 of shaft 51. Groove 52, with its two flanking opposed shoulders, comprises a cam follower which cooperates with slot 97 to lift turntable 50 as described below.

Next, a sectional view of a video disc player after turntable 50 is lifted is shown in FIG. 3. If lifter element 90 is moved along chassis 70 to the right, shaft 51 will be lifted from a bottom horizontal portion 92 of lifter 90 up and along an incline 93 which is formed in the intermediate portion of lifter 90. As a result, end 53 of shaft 51 moves up and is received and supported by the horizontal portion of a tongue 96 which is formed at an upper horizontal portion 94 of lifter 90. As turntable 50 move upward it contacts video disc 3. In the uppermost position turntable 50 has lifted the video disc 3 away from supports 40 and as a result, the player is ready for playback. The rotation force is supplied to turntable 50 via a belt 100.

Figure 4:
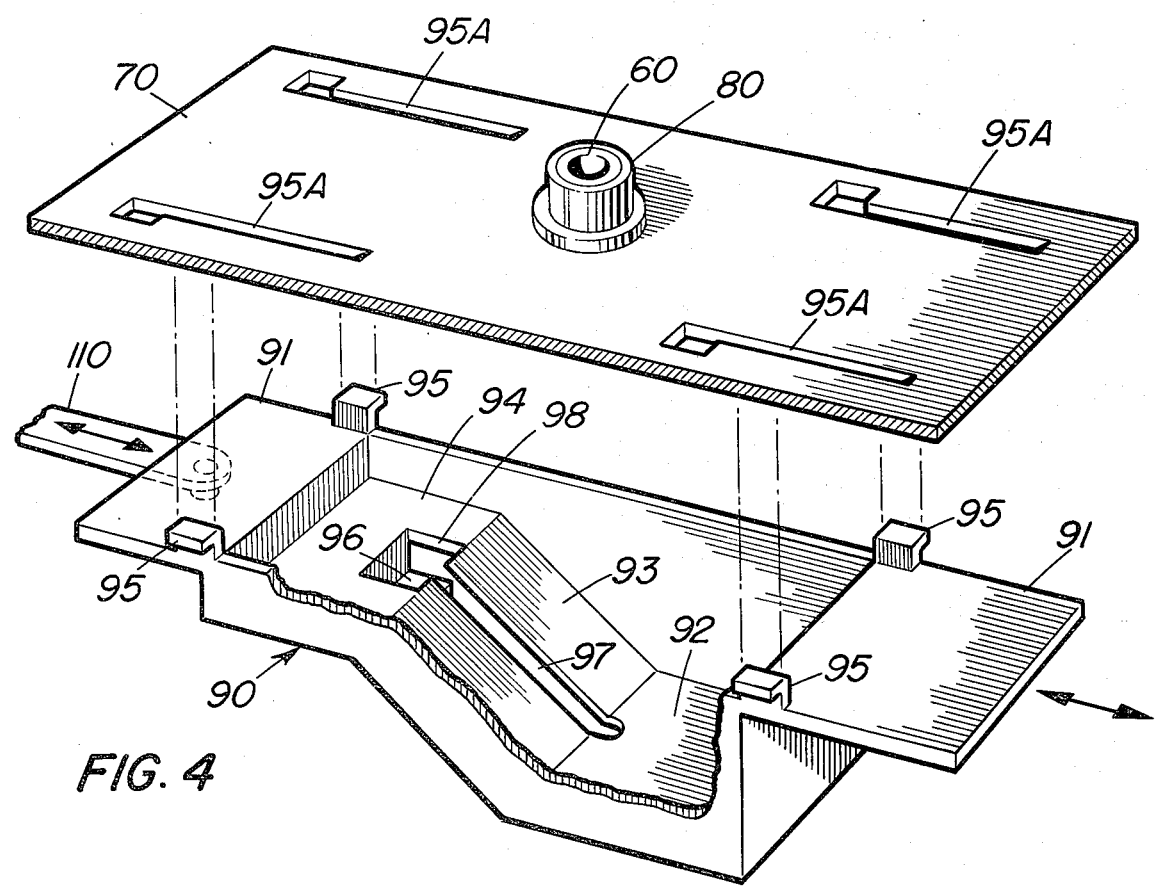
FIG. 4 is an exploded perspective view of a turntable lifter and the chassis member which supports it.

Referring to FIG. 4, there will be described a lifter element 90. As shown, lifter 90 has a slot 97 extending longitudinally from a bottom horizontal portion 92 and inclined portion 93, which fits in groove 52 of shaft 51. Slot 97 of lifter 90 has approximately the same width as diameter of groove 52 of shaft 51. Accordingly, shaft 51 is held in slot 97 of lifter 90 so that vibration does not occur between shaft 51 and lifter 90. Lifter 90, further, has a rectangular hole 98 in upper horizontal portion 94 at the position which is opposite the horizontal portion of tongue 96, so that the end portion of shaft 51 passes through. Because the lowest and highest positions of turntable 50 can be determined by bottom horizontal portion 92 and upper horizontal portion 94 (i.e., tongue 96 of lifter 90), turntable 50 may be positioned exactly even if design of incline 93 of lifter 90 has an error. A fragment of chassis 70 is shown in FIG. 4 to illustrate the slots 95A which slidably support flanges 95 of the lifter 90.

Video disc 3 has a tendency to become charged with an electrostatic charge. As a result, an electric discharge occasionally occurs between video disc and an electrode needle (not shown) which picks up a signal from video disc 3. The electrostatic discharge causes noise in the playback. Accordingly, lifter 90 is made of conductive material so that any electrostatic charge on video disc 3 may be discharged to chassis 70 via turntable 50 and shaft 51. In another embodiment, only tongue 96 of lifter 90 is made of conductive material and tongue 96 is grounded via a ground line (not shown).

A driving arm 110 is linked to the left top horizontal portion 91 of lifter 90 as means which moves lifter 90 in the left and right directions (as seen in FIGS. 2 & 3) along chassis 70. The arm 110 may be moved manually or by an electric motor (not shown).

After completion of playback, lifter 90 is moved to the left (as seen in FIGS. 2 & 3) and shaft 51 moves down slot 97 along incline 93 lowering turntable 50 until video disc 3 again rests on supports 40.

End 53 of shaft 51 has approximately a conical or spherical shape so that it may make a point contact with the horizontal portion of tongue 96 of lifter 90 to reduce friction and rotate smoothly. End 53 and groove 52 are formed on the bottom end of shaft 51. Lifter 90 may be press-formed of one piece of sheet metal.

We claim:

1. A turntable lifting apparatus of a video disc player comprising:
   a turntable for supporting a video disc;
   a chassis attached to said player under said turntable;
   a bearing attached to said chassis for rotatably supporting a shaft of said turntable;
   a turntable lifter slidably attached to said chassis, said lifter having an inclined slotted plate which engages with a portion of said turntable shaft for lifting said turntable, said shaft has a groove adjacent an end portion of said shaft, said groove engaging with said inclined slotted plate, said turntable lifter further comprising: a bottom horizontal portion for defining the lowest position of said turntable: an upper horizontal portion for defining the uppermost position of said turntable; said slot being formed in the longitudinal direction of said inclined slotted plate, which contacts with said groove; a tongue formed at said upper horizontal portion and having a horizontal surface for receiving and supporting the end portion of said turntable shaft after said turntable is lifted; and a rectangular hole formed in said upper horizontal portion at a position which is opposite the horizontal surface of said tongue, said hole being linked with said slot.

2. A video turntable positioning apparatus for moving a rotatable video turntable between retracted and extended positions, the turntable being mounted on a shaft which is rotatably supported on a chassis and is slidable along its axis of rotation between retracted and extended positions, the positioning apparatus comprising:
   a turntable lifter slidable on said chassis transversely of said axis of rotation;
   a cam plate carried by said lifter and movable therewith, said cam plate being inclined relative to said lifter and said axis of rotation; and
   a cam follower on said shaft in engagement with said cam plate to convert transverse movement of said lifter to axial movement of said shaft, said cam plate includes a slot, said slot being inclined relative to said lifter and said axis of rotation, said cam follower has a circumferential groove defining a guide portion of reduced diameter and two opposed shoulders flanking said guide portion, said guide portion being disposed in said slot and said shoulders adapted to engage said plate on opposite sides of said slot to convert transverse movement of said lifter to axial movement of said shaft.

3. The video turntable positioning apparatus of claim 2 wherein said turntable lifter further comprises:
   a lower horizontal portion for defining the lowest position of said turntable;
   an upper horizontal portion for defining the uppermost position of said turntable;
   and said slot being formed in the longitudinal direction of said cam plate.

4. Video turntable positioning apparatus of claim 3 wherein said turntable lifter furthermore comprises:
   a tongue formed at said upper horizontal portion for receiving and supporting the end portion of said shaft and after said turntable is lifted; and
   a rectangular hole formed in the upper horizontal portion at a position which is opposite the horizontal portion of said tongue, the hole being linked with said slot.

5. A video turntable positioning apparatus for moving a rotatable video turntable between retracted and extended positions, the turntable being mounted on a shaft which is rotatably supported on a chassis and is slidable along its axis of rotation between retracted and extended positions, the positioning apparatus comprising:
   a turntable lifter slidable on said chassis transversely of said axis of rotation;
   a slotted plate carried by said lifter and movable therewith, said slotted plate being inclined relative to said lifter and to said axis of rotation; and
   a circumferential groove on said shaft defining a guide portion of reduced diameter and two opposed shoulders flanking said guide portion, said guide portion being disposed in said slot and said shoulders adapted to engage said plate on opposite sides of said slot to convert transverse movement of said lifter to axial movement of said shaft.

* * * * *